US009261996B2

(12) United States Patent
Jung et al.

(10) Patent No.: US 9,261,996 B2
(45) Date of Patent: Feb. 16, 2016

(54) MOBILE TERMINAL INCLUDING TOUCH SCREEN SUPPORTING MULTI-TOUCH INPUT AND METHOD OF CONTROLLING THE SAME

(71) Applicant: Samsung Electronics Co., Ltd., Gyeonggi-do (KR)

(72) Inventors: Byung-Min Jung, Gyeonggi-do (KR); Yeong-Woong Yoo, Gyeonggi-do (KR); Yu-Jin Lee, Gyeonggi-do (KR); Eun-Joo Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 14/324,757

(22) Filed: Jul. 7, 2014

(65) Prior Publication Data
US 2015/0009162 A1    Jan. 8, 2015

(30) Foreign Application Priority Data
Jul. 5, 2013    (KR) .......................... 10-2013-0079301

(51) Int. Cl.
*G06F 3/041*    (2006.01)
(52) U.S. Cl.
CPC ...................................... *G06F 3/041* (2013.01)
(58) Field of Classification Search
CPC ........................................................ G06F 3/041
See application file for complete search history.

(56) References Cited

U.S. PATENT DOCUMENTS

| 2011/0175821 | A1 | 7/2011 | King |
| 2012/0182296 | A1 | 7/2012 | Han |
| 2013/0326340 | A1* | 12/2013 | Woo ....................... G06F 3/0484 715/243 |

FOREIGN PATENT DOCUMENTS

| JP | 2012-088768 | 5/2012 |
| KR | 20120070641 A | 7/2012 |
| KR | 20120085783 A | 8/2012 |

* cited by examiner

*Primary Examiner* — Gerald Johnson
(74) *Attorney, Agent, or Firm* — The Farrell Law Firm, P.C.

(57) ABSTRACT

Methods and apparatus are provided for controlling a mobile terminal including a touch screen supporting a multi-touch input. The method includes: determining a number of one or more points inputted as a first touch input on the touch screen; when the number is 3, determining the first touch input as a three-point input; determining a size of a largest internal angle of a triangle generated by connecting points of the three-point input on the touch screen; displaying one of a linear tool and a circular tool based on a size of the largest internal angle of the triangle; receiving a second touch input; generating a line corresponding to the second touch input by interworking with one of the linear tool and the circular tool; and displaying the generated line on the touch screen.

20 Claims, 11 Drawing Sheets

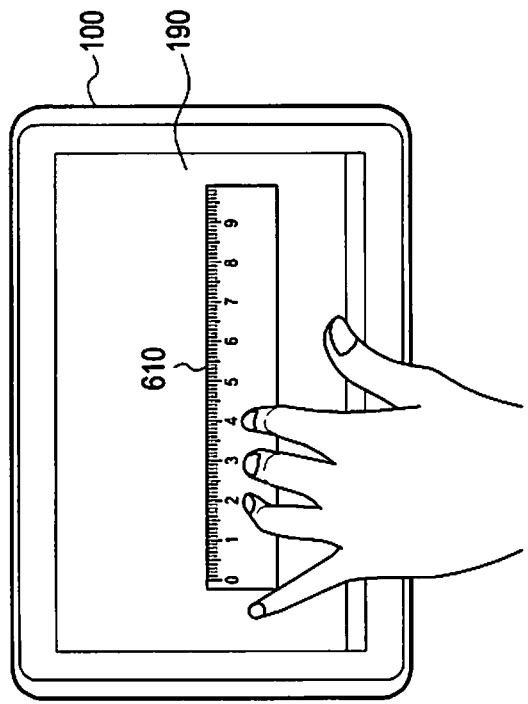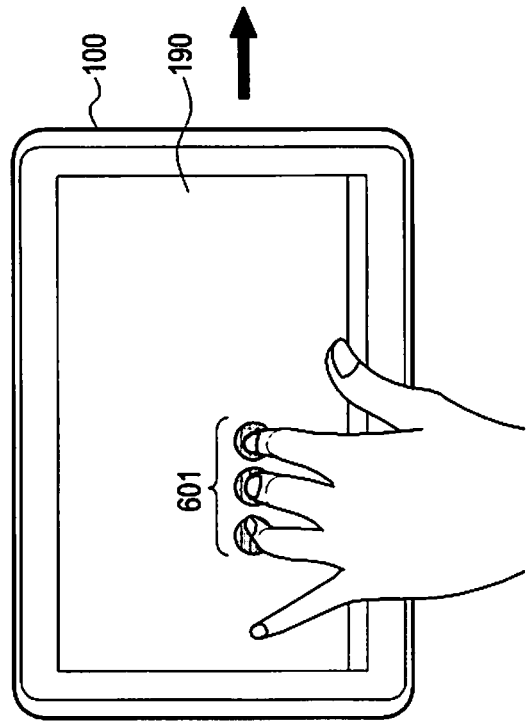
FIG.6A

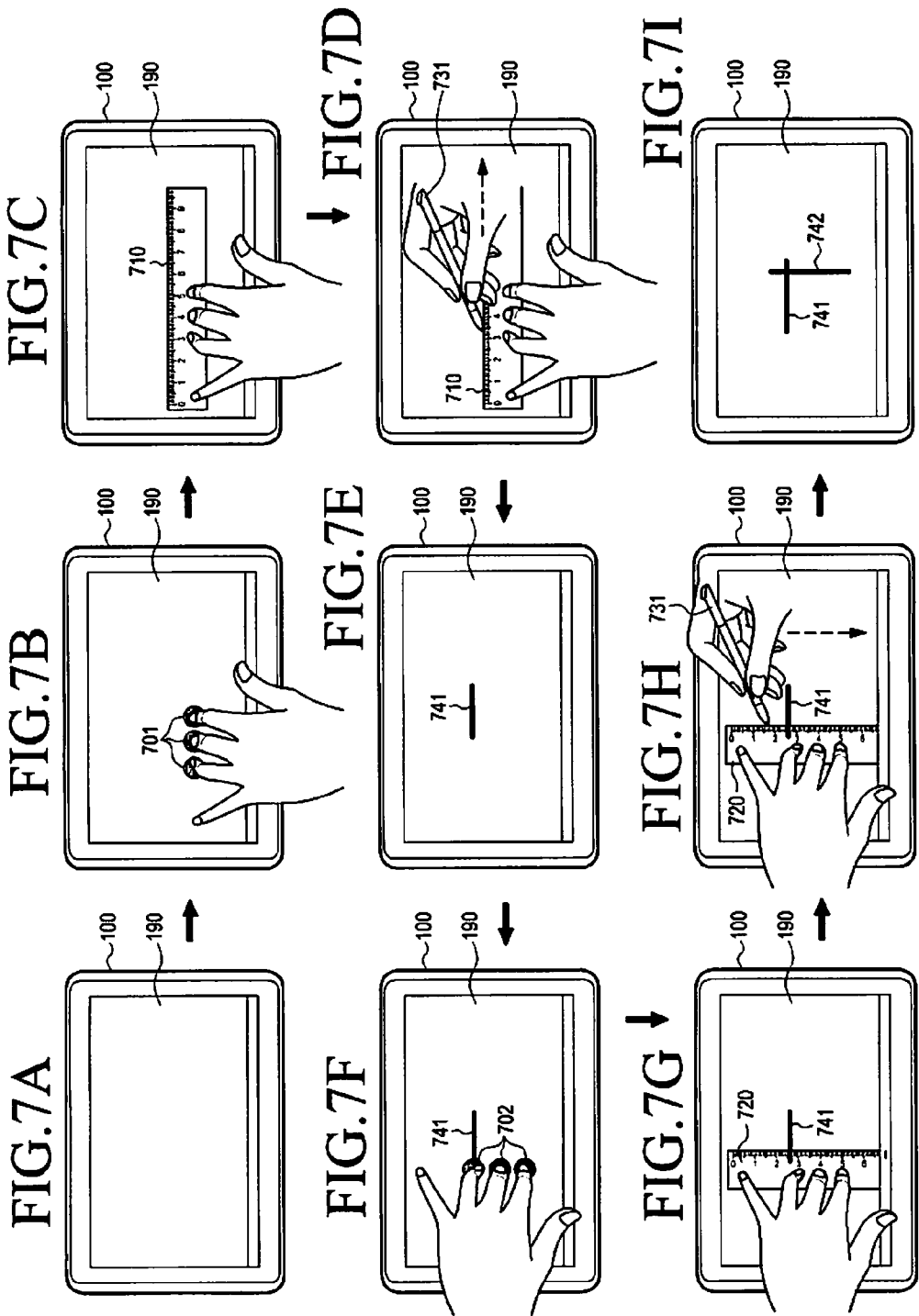

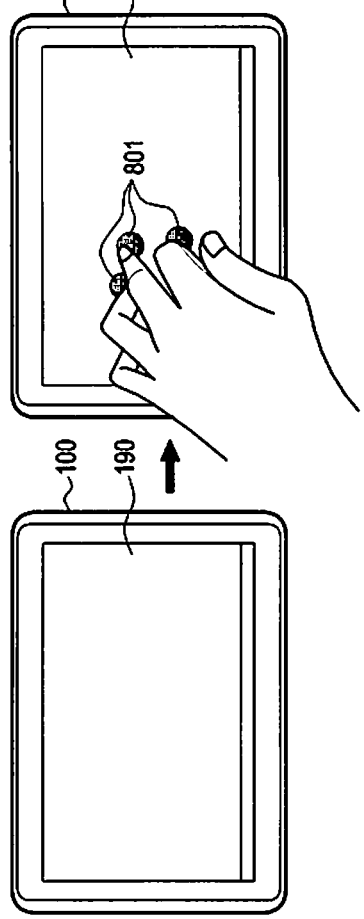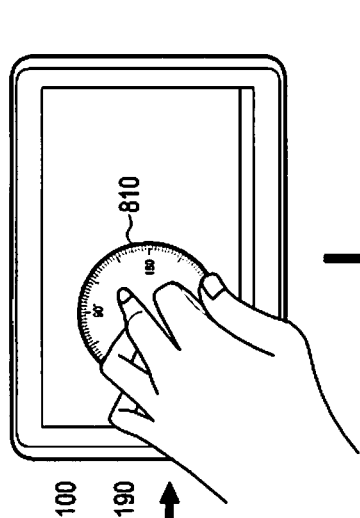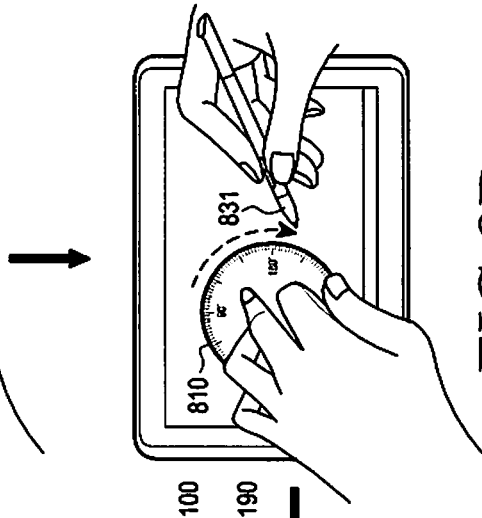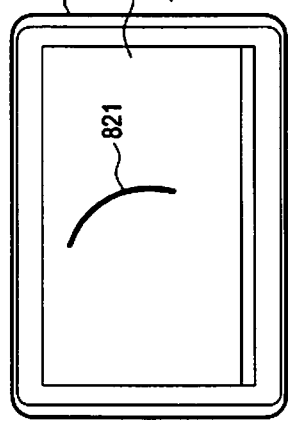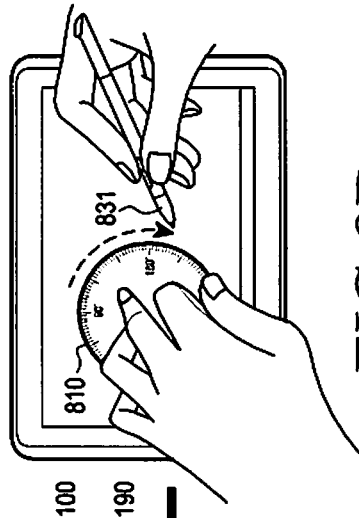

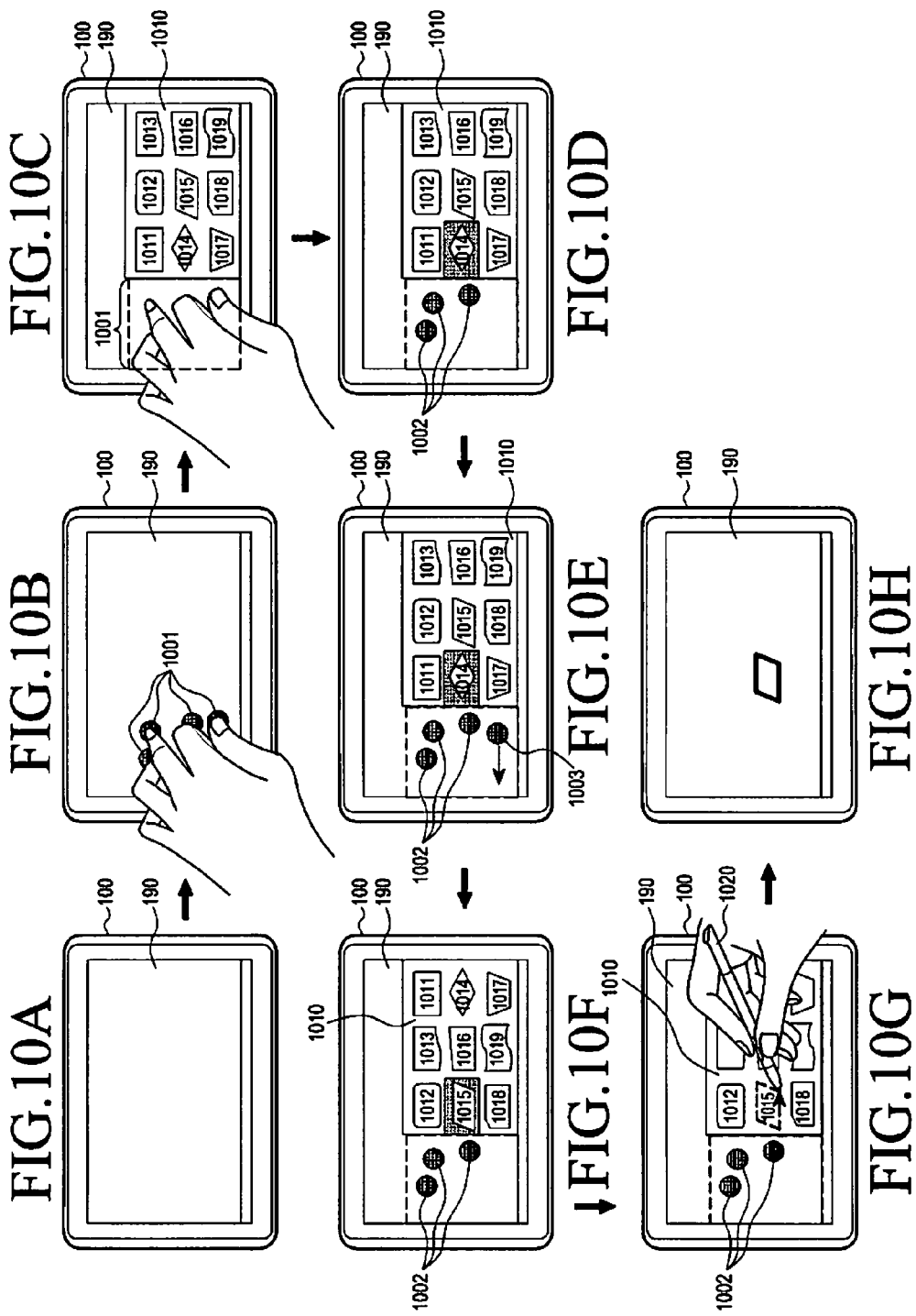

under 35 U.S.C. §119(a) to
MOBILE TERMINAL INCLUDING TOUCH SCREEN SUPPORTING MULTI-TOUCH INPUT AND METHOD OF CONTROLLING THE SAME

PRIORITY

This application claims priority under 35 U.S.C. §119(a) to Korean Application Serial No. 10-2013-0079301, which was filed in the Korean Intellectual Property Office on Jul. 5, 2013, the entire content of which is incorporated herein by reference.

BACKGROUND OF THE INVENTION

1. Field of the Invention

The present invention relates generally to a terminal including a touch screen supporting a multi-touch input, and more particularly, to a mobile terminal capable of drawing a line or a figure by using a drawing tool, and a method of controlling the mobile terminal.

2. Description of the Related Art

Mobile terminals now support a multi touch function, which simultaneously recognizes a plurality of touch points on a display. However, applications able to utilize the multi touch function have been slower to develop. For example, a drawing tool may only support drawing functions such as, for example, drawing a straight line, a quadrangle, and a circle using a single touch input, even though the drawing tool is installed in a terminal supporting the multi-touch input. The single touch input lacks accuracy or precision. More particularly, when a user who uses a device desires to draw a straight line using a drawing tool, it is difficult to change a start point after the start point is determined and to draw the straight line in a desired direction. Further, when a circle is drawn, it is difficult to determine a position of a center of the circle. When an oval is drawn, a plurality of touches is required.

In a conventional terminal supporting the multi-touch function, the user is required to add a figure through a menu in a drawing state, or change a mode to a tool use mode in a drawing mode of the drawing tool. After changing the mode to the tool use mode, the user draws a figure, moves the drawn figure to a desired position, and then returns back to the drawing mode. Such a process is complex and inefficient. Further, since the mode is required to be changed each time the drawing tool is used, the number of operations increases along with a processing time.

SUMMARY OF THE INVENTION

The present invention has been made to address at least the above problems and/or disadvantages and to provide at least the advantages described below. Accordingly, an aspect of the present invention provides a mobile terminal that can draw a line or a figure by using a drawing tool, and a method of controlling the mobile terminal.

In accordance with an aspect of the present invention, a method is provided for controlling a mobile terminal including a touch screen supporting a multi-touch input. The method includes: determining a number of one or more points inputted as a first touch input on the touch screen; when the number is 3, determining the first touch input as a three-point input; determining a size of a largest internal angle of a triangle generated by connecting points of the three-point input on the touch screen; displaying one of a linear tool and a circular tool based on a size of the largest internal angle of the triangle; receiving a second touch input; generating a line corresponding to the second touch input by interworking with one of the linear tool and the circular tool; and displaying the generated line on the touch screen.

In accordance with another aspect of the present invention, a method is provided for controlling a mobile terminal including a touch screen supporting a multi-touch input. The method includes: determining a number of one or more points inputted as a first touch input on the touch screen; when the number is 4, determine the first touch input as a four-point input; displaying a figure tool corresponding to the four-point input; receiving a third touch input selecting one of a plurality of figures included in the figure tool; and displaying the selected one of the plurality of figures on the touch screen. In accordance with an additional aspect of the present invention, a mobile terminal is provided that includes a touch screen configured to receive a first touch input, and a second touch input; and a controller configured to: determine a number of one or more points inputted first touch input on the touch screen; when the number is 3, determine the first touch input as a three-point input; determine a size of a largest internal angle of a triangle generated by connecting points of the three-point input on the touch screen, control the touch screen to display one of a linear tool and a circular tool based on a size of the largest internal angle of the triangle, generate a line corresponding to the second touch input by interworking with the one of the linear tool and the circular tool, and control the touch screen to display the generated line.

In accordance with a further aspect of the present invention, a mobile terminal is provided that includes a touch screen configured to receive a first touch input, and a second touch input; and a controller configured to: determine a number of one or more points inputted as a first touch input on the touch screen; when the number is 4, determine the first touch input as a four-point input; control the touch screen to display a figure tool corresponding to the four-point input; when a third touch input selecting one of a plurality of figures included in the figure tool is received, control the touch screen to display the selected one of the plurality of figures on the touch screen.

BRIEF DESCRIPTION OF THE DRAWINGS

The above and other aspects, features, and advantages of the present invention will be more apparent from the following detailed description when taken in conjunction with the accompanying drawings, in which:

FIGS. 6A and 6B are diagrams illustrating execution of a linear tool in the mobile terminal illustrated in FIG. 1, according to an embodiment of the present invention;

FIGS. 7A to 7I are diagrams illustrating execution of a linear tool in the mobile terminal illustrated in FIG. 1, according to another embodiment of the present invention;

FIGS. 8A to 8E are diagrams illustrating execution of a circular tool in the mobile terminal illustrated in FIG. 1, according to an embodiment of the present invention;

FIGS. 10A to 10H are diagrams illustrating execution of a figure tool in the mobile terminal illustrated in FIG. 1, according to an embodiment of the present invention.

DETAILED DESCRIPTION OF EMBODIMENTS OF THE PRESENT INVENTION

Figure 1:
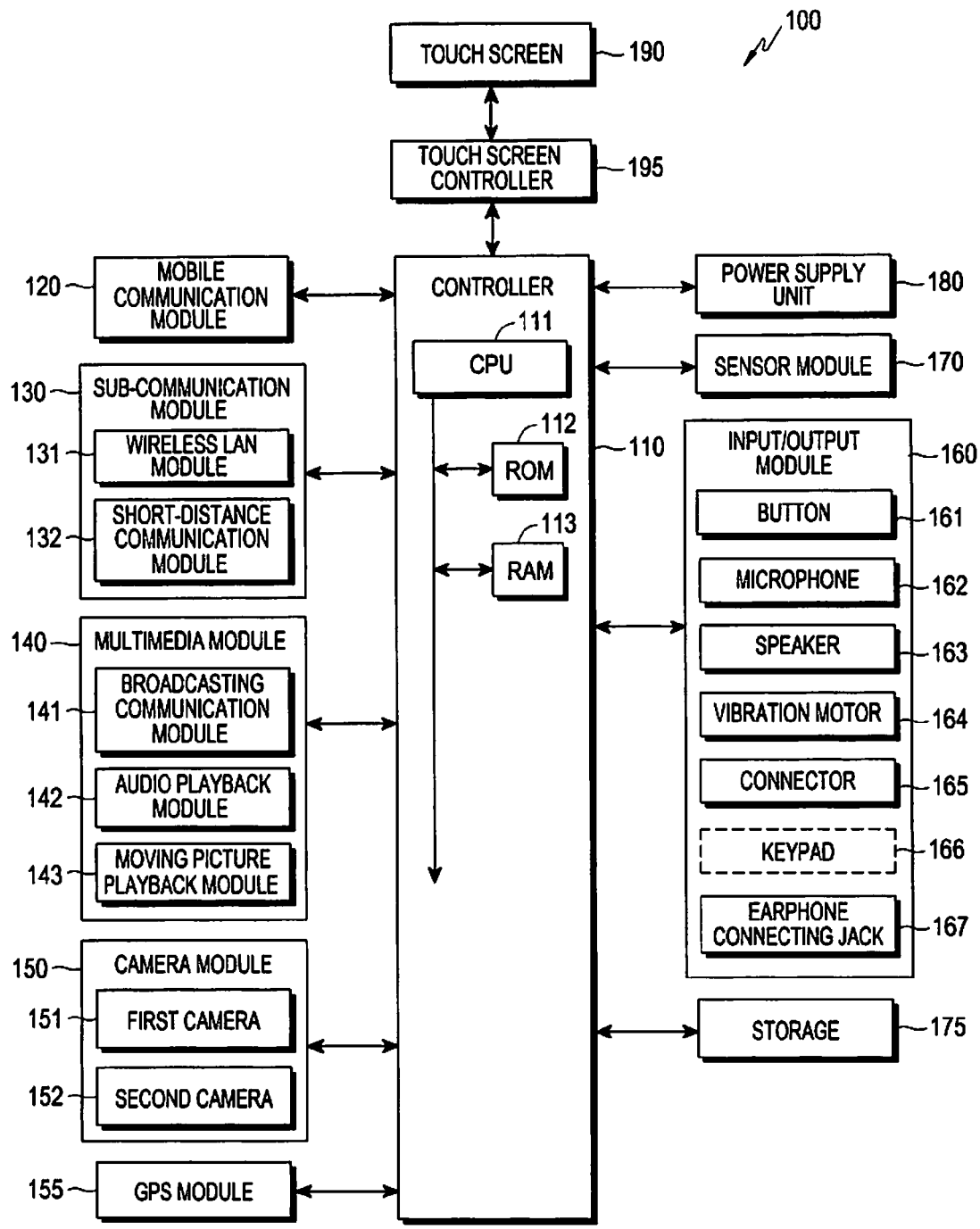
FIG. 1 is a block diagram illustrating a configuration of a mobile terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Various definitions found in the following description are provided only to help general understanding of the present invention, and it is apparent to those skilled in the art that the present invention can be implemented without such definitions.

FIG. 1 is a block diagram illustrating a configuration of a mobile terminal, according to an embodiment of the present invention.

Referring to FIG. 1, a mobile terminal 100 includes a controller 110, an input/output module 160, and a touch screen 190. The mobile terminal further includes at least one of a mobile communication module 120, a sub communication module 130, a multimedia module 140, a camera module 150, a Global Positioning System (GPS) module 155, a sensor module 170, a storage unit 175, a power supply unit 180, and a touch screen controller 195.

The controller 110 includes a Central Processing Unit (CPU) 111, a Read Only Memory (ROM) 112, which stores a control program for controlling the mobile terminal 100, and a Random Access Memory (RAM) 113, which is used as a storage area for storing a signal or data input from the outside of the mobile terminal 100 or for work performed in the mobile terminal 100. The CPU 111 includes a single core, a dual core, a triple core, or a quadruple core. The CPU 111, the ROM 112, and the RAM 113 may be mutually connected to each other through an internal bus.

The controller 110 controls the mobile communication module 120, the sub communication module 130, the multimedia module 140, the camera module 150, the GPS module 155, the input/output module 160, the sensor module 170, the storage unit 175, the power supply unit 180, the touch screen 190, and the touch screen controller 195.

According to an embodiment of the present invention, the controller 110 controls various contents displayed on the touch screen 190, or controls the display of the contents by controlling the touch screen 190.

The controller 110 controls the mobile terminal 100 to perform an operation according to a touch input detected through the touch screen 190. When a touch input of at least one point is input through the touch screen 190, the controller 110 controls the mobile terminal 100 to perform an operation corresponding to the touch input.

In an embodiment of the present invention, the controller 110 controls the mobile terminal 100 to perform a drawing mode.

In the drawing mode, the user is able to draw a picture using the mobile terminal 100 by converting a user's input, for example, a touch input by a user's finger or a touch input by a stylus pen input through the touch screen 190, into at least one point, a straight line, a curved line, or a figure.

In an embodiment of the present invention, when the drawing mode is executed, the controller 110 determines whether a multi-touch input is input through the touch screen 190. When the multi touch-input is input, the controller 110 controls the touch screen 190, or the touch screen controller 195, to display a drawing tool according to the multi touch input.

According to an embodiment of the present invention, the multi-touch input is a touch input of at least two points on the touch screen 190. Preferably, the multi-touch input is a touch input of at least three points.

In an embodiment of the present invention, the drawing tool may be embodied as at least one of a linear tool, a circular tool, and a figure tool. The linear tool is used for drawing a straight line, and the circular tool is used for drawing a circle, an arc, an oval, and a curved line, such as a part of an oval. The figure tool is a tool for drawing, for example, a triangle, a quadrangle, a pentagon, a hexagon, a circle, a cylinder, a cone, a prism, a pyramid, a polyhedron, an ellipsoid, and a sphere. The linear tool may also be referred to as a straight-line type tool, and the circular tool may also be referred to as a curved line type tool.

When the drawing tool is displayed on the touch screen 190, the controller 110 determines whether a user input, for example, a touch input, other that the multi touch input, is input. It is preferable that the user input is a touch input close to the drawing tool. Specifically, the user input may be a touch input that is within the drawing tool, or that is within 1 centimeter (cm) of a perimeter of the drawing tool. When the user input is input, the controller 110 controls the touch screen 190, or the touch screen controller 195, to display a line or a figure according to the drawing tool, based on the user input. In an embodiment of the present invention, a straight line is generated by connecting a start point, where the touch input starts, and an end point, where the touch input ends. In another embodiment of the present invention, a straight line is generated by connecting a start point, where the touch input starts, and a point that is adjacent to an end point, where the touch input ends. This embodiment corresponds to a straight line drawn parallel to the linear tool.

The camera module 150 includes at least one of a first camera 151 and a second camera 152 for photographing a still image or a video, according to a control of the controller 110. The first camera 151 or the second camera 152 may include an auxiliary light source (for example, a flash (not shown) providing light required for the photographing. The first camera 151 may be disposed on a front surface of the mobile terminal 100, and the second camera 152 may be disposed on a back surface of the mobile terminal 100. In another embodiment, the first camera 151 and the second camera 152 are closely located to each other (for example, an interval between the first camera 151 and the second camera 152 is larger than 1 cm and smaller than 8 cm) and photograph a three dimensional still image or a three dimensional video.

The storage unit 175 stores a signal or data input/output according to the operation of the mobile communication module 120, the sub-communication module 130, the multimedia module 140, the camera module 150, the GPS module 155, the input/output module 160, the sensor module 170, or the touch screen 190. The storage unit 175 stores a control program and applications for controlling the mobile terminal 100 or the controller 110.

The term "storage unit" includes the storage unit 175, the ROM 112 and the RAM 113 within the controller 110, and/or a memory card, such as, for example, a Secure Digital (SD)

card or a memory stick, installed in the mobile terminal 100. The storage unit may include a non-volatile memory, a volatile memory, a Hard Disk Drive (HDD), or a Solid State Drive (SSD).

The touch screen 190 provides user interfaces corresponding to various services, such as, for example, a call, data transmission, broadcasting, and photography. The touch screen 190 transmits an analog signal corresponding to at least one touch, input into the user interface, to the touch screen controller 195. The touch screen 190 may receive at least one touch through a user's body, such as, for example, fingers including a thumb, or through a touchable input means, such as, for example, a stylus pen. Further, the touch screen 190 may receive successive motions of one touch. The touch screen 190 may transmit an analog signal corresponding to the successive motions of the input touch to the touch screen controller 195.

According to an embodiment of the present invention, a touch is not limited to contact between the touch screen 190 and the user's body or the touchable input means, and may include a non-contact position, such as, for example, a position when a detectable interval between the touch screen 190 and the user's body or the touchable input means is smaller than or equal to 1 mm). The detectable interval of the touch screen 190 may be changed according to a capability or structure of the mobile terminal 100.

The touch screen 190 may be implemented in a resistive type touch screen, a capacitive type touch screen, an infrared type touch screen, or an acoustic wave type touch screen.

When the multi touch input is input, the touch screen 190 displays a drawing tool under a control of the controller 110. Further, when a user input (e.g., a touch input), other than the multi touch input, is input, the touch screen 190 displays a line or a figure according to the drawing tool, and based on the touch input, under a control of the controller 110.

The sub communication module 130 includes at least one of a wireless Local Area Network (LAN) module 131 and a short distance communication module 132. The multimedia module 140 includes at least one of a broadcasting communication module 141, an audio reproduction or playback module 142, and a video reproduction, or moving picture playback, module 143. The input/output module 160 includes at least one of a button 161, a microphone 162, a speaker 163, a vibration motor 164, a connector 165, a keypad 166, and an earphone-connecting jack 167.

The mobile communication module 120 allows the mobile terminal 100 to be connected with an external device by using at least one antenna under a control of the controller 110. The mobile terminal 100 and the external device may be connected to each other through mobile communication. The mobile communication module 120 transmits/receives a wireless signal for a voice call, a video call, a Short Message Service (SMS), or a Multimedia Message Service (MMS) to/from a mobile phone (not shown), a smart phone (not shown), a tablet PC, or another device (not shown) having a phone number input into the mobile terminal 100.

The sub communication module 130 may include at least one of the wireless LAN module 131 and the short distance communication module 132. For example, the sub communication module 130 may include only the wireless LAN module 131, only the short distance communication module 132, or both the wireless LAN module 131 and the short distance communication module 132.

The wireless LAN module 131 may be Internet-connected in a place where a wireless Access Point (AP) (not shown) is installed according to a control of the controller 110. That is, the wireless LAN module 131 supports a wireless Internet connection of the mobile terminal 100. The wireless LAN module 131 supports a wireless LAN standard (IEEE802.11x) of the Institute of Electrical and Electronics Engineers (IEEE). The short distance communication module 132 may wirelessly perform short distance communication between the mobile terminal 100 and an image forming apparatus (not shown) according to a control of the controller 110. A short distance communication scheme may include Bluetooth, Infrared Data Association (IrDA) communication, WiFi-Direct communication, Near Field Communication (NFC) and the like.

The mobile terminal 100 may include at least one of the mobile communication module 120, the wireless LAN module 131, and the short distance communication module 132 according to a capability thereof. For example, the mobile terminal 100 may include any combination of the mobile communication module 120, the wireless LAN module 131, and the short distance communication module 132 according to a capability thereof.

The multimedia module 140 may include the broadcasting communication module 141, the audio reproduction module 142, or the video reproduction module 143. The broadcasting communication module 141 may receive a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna (not shown) according to a control of the controller 110. The audio reproduction module 142 may reproduce a digital audio file (for example, a file having a file extension of mp3, wma, ogg, or wav) stored or received according to a control of the controller 110. The video reproduction module 143 may reproduce a digital video file (for example, a file having a file extension of mpeg, mpg, mp4, avi, mov, or mkv) stored or received according to a control of the controller 110. The video reproduction module 143 may reproduce the digital audio file.

The multimedia module 140 may include the audio reproduction module 142 or the video reproduction module 143, and not the broadcasting communication module 141. Further, the audio reproduction module 142 or the video reproduction module 143 of the multimedia module 140 may be included in the controller 110.

The GPS module 155 receives radio waves from a plurality of GPS satellites and calculates a position of the mobile terminal 100 by using Time of Arrival from the GPS satellites to the mobile terminal 100.

The input/output module 160 may include at least one of the button 161, the microphone 162, the speaker 163, the vibration motor 164, the connector 165, and the keypad 166.

The button 161 may be formed on a front surface, a side surface, or a back surface of the mobile terminal 100, and may include at least one of a power/lock button (not shown), a volume button (not shown), a menu button, a home button, a back button, and a search button 161.

The microphone 162 receives a voice or a sound to generate an electrical signal according to a control of the controller 110.

The speaker 163 may output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the outside of the mobile terminal 100 according to a control of the controller 110. The speaker 163 may output a sound (for example, button tone corresponding to phone communication, ringing tone, and a voice of another user) corresponding to a function performed by the mobile terminal 100. One speaker 163 or a plurality of speakers 163 may be formed on a suitable position or positions of the housing of the mobile terminal 100.

The vibration motor 164 may convert an electrical signal to a mechanical vibration according to a control of the controller 110. For example, when the mobile terminal 100 in a vibration mode receives a voice or video phone call from another device (not shown), the vibration motor 164 is operated. One vibration motor 164 or a plurality of vibration motors 164 may be formed within the housing of the mobile terminal 100. The vibration motor 164 may operate in accordance with a touch action of the user on the touch screen or successive motions of the touch on the touch screen 190.

The connector 165 may be used as an interface for connecting the mobile terminal 100 with an external device (not shown) or a power source (not shown). The mobile terminal 100 may transmit or receive data stored in the storage unit 175 of the mobile terminal 100 to or from an external device (not shown) through a wired cable connected to the connector 165 according to a control of the controller 110. Further, the mobile terminal 100 may receive power from the power source (not shown) through the wired cable connected to the connector 165 or charge a battery (not shown) by using the power source.

The keypad 166 may receive a key input from the user for the control of the mobile terminal 100. The keypad 166 includes a physical keypad (not shown) formed in the mobile terminal 100 or a virtual keypad (not shown) displayed on the touch screen 190. The physical keypad (not shown) formed in the mobile terminal 100 may be excluded according to a capability or structure of the mobile terminal 100.

An earphone (not shown) is inserted into the earphone connecting jack 167 to be connected with the mobile terminal 100.

The sensor module 170 includes at least one sensor for detecting a state of the mobile terminal 100. The at least one sensor may include one or more of a proximity sensor, an illuminance sensor, a motion sensor, a geo-magnetic sensor, a gravity sensor, and an altimeter. The at least one sensor detects a state, generates a signal corresponding to the detection, and transmits the signal to the controller 110. The sensors of the sensor module 170 may be added or omitted according to the capability of the mobile terminal 100. For example, the sensor module 170 may include a proximity sensor for detecting whether the user approaches the mobile terminal 100, an illuminance sensor (not shown) for detecting an amount of light around the mobile terminal 100, a motion sensor (not shown) for detecting an operation (for example, a rotation of the mobile terminal 100, or an acceleration or a vibration applied to the mobile terminal 100) of the mobile terminal 200, a geo-magnetic sensor (not shown) for detecting a point of the compass by using Earth's magnetic field, a gravity sensor for detecting an action direction of the gravity, and an altimeter for measuring atmospheric pressure to detect an altitude.

According to an embodiment of the present, the sensor module 170 includes the proximity sensor. The proximity sensor detects a user's motion (for example, a motion of a user's finger) within a predetermined range of the touch screen 190. For example, when the touch screen 190 is implemented as a capacitive type touch screen, the sensor module 170 implemented by the proximity sensor may detect a user's motion by detecting a change in capacitance generated in a predetermined range (for example, a height of 10 cm) from the touch screen 190.

The power supplier 180 can supply power to one battery or a plurality of batteries arranged at the mobile terminal 100, according to a control of the controller 110. The one battery or the plurality of batteries supplies power to the mobile terminal 100. Further, the power supplier 180 may supply power input from an external power source to the mobile terminal 100 through a wired cable connected to the connector 165. In addition, the power supplier 180 may supply power wirelessly input from the external power source to the mobile terminal 100 through a wireless charging technology.

The touch screen controller 195 converts an analog signal received from the touch screen 190 to a digital signal (for example, X and Y coordinates) and transmits the converted digital signal to the controller 110. The controller 110 may control the touch screen 190 by using the digital signal received from the touch screen controller 195. For example, the controller 110 allows a short-cut icon, displayed on the touch screen 190, to be selected or executed in response to the touch. Further, the touch screen controller 195 may be included in the controller 110.

In an embodiment of the present invention, the touch screen controller 195 detects a coordinate on the touch screen 190, which corresponds to a proximity sensing input detected by the sensor module 170. For example, the sensor module detects a proximity sensing input, for selecting one point (first point), when the input means is within a predetermined range from the touch screen 190. Further, it is assumed that the proximity sensing is implemented in a capacitive type touch screen. When the sensing module 170 detects a change in capacitance generated within a predetermined range of the touch screen 190, it controls the touch screen controller 195 to extract a coordinate of a point (second point) on the touch screen 190 corresponding to the point (first point) where the capacitance has been changed. For example, the second point may be a point on the touch screen 190 located close to the first point.

In an embodiment of the present invention, the mobile terminal 100 may be connected with an external device by using an external device connector such as the sub communication module 130, the connector 165, and the earphone-connecting jack 167.

The external device includes various devices attached to or detached from the mobile terminal 100 through a wire, such as, for example, an earphone, an external speaker, a Universal Serial Bus (USB) memory, a charger, a cradle/dock, a Digital Multimedia Broadcasting (DMB) antenna, a mobile payment related device, a health management device (i.e., blood sugar tester or the like), a game machine, a car navigation device and the like. Further, the external device may include a Bluetooth communication device, a short distance communication device such as a Near Field Communication (NFC) device, a WiFi Direct communication device, and a wireless Access Point (AP) which may be wirelessly connected to the mobile terminal 100. In addition, the external device may include another device, a mobile phone, a smart phone, a tablet Personal Computer (PC), a desktop PC, and a server.

Figure 2:
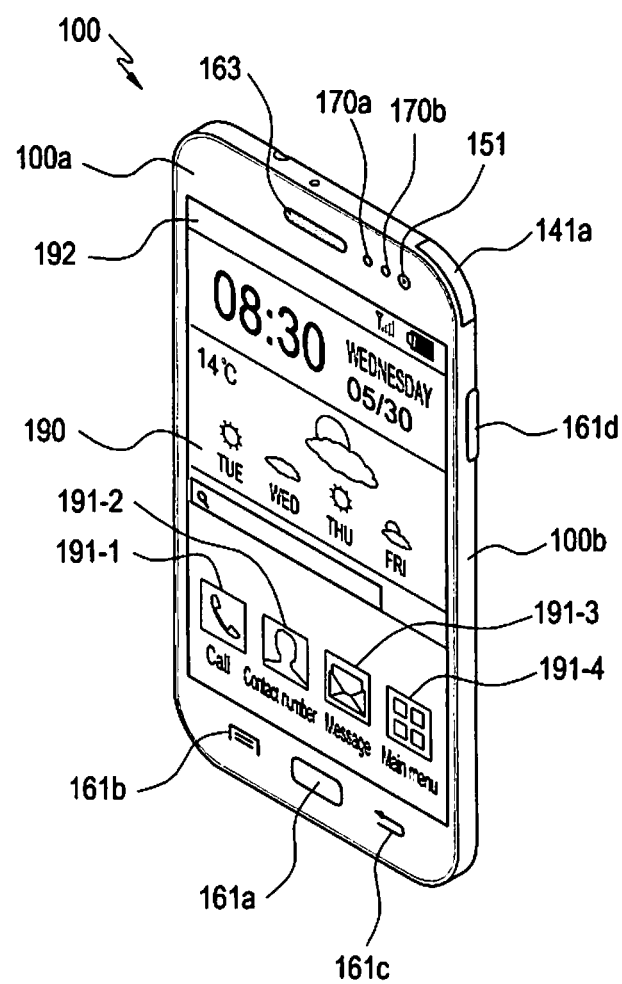
FIG. 2 is a diagram illustrating a front perspective view of a mobile terminal, according to an embodiment of the present invention.
Figure 3:
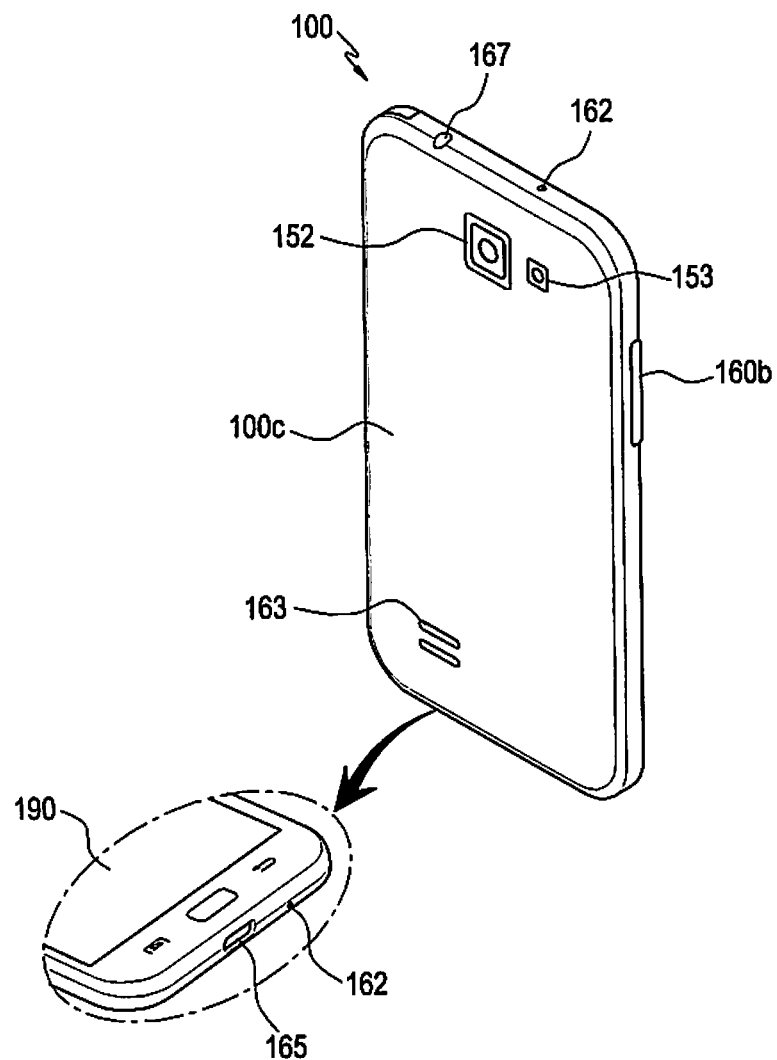
FIG. 3 is a diagram illustrating a rear perspective view of a mobile terminal, according to an embodiment of the present invention.

FIG. 2 is a diagram illustrating a front perspective view of the mobile terminal according to an embodiment of the present invention. FIG. 3 is a diagram illustrating a rear perspective view of the mobile terminal, according to an embodiment of the present invention.

Referring to FIG. 2, the touch screen 190 is centrally disposed on a front surface 100*a* of the mobile terminal 100. The touch screen 190 occupies most of the front surface 100*a* of the mobile terminal 100.

FIG. 2 illustrates an embodiment of the present invention in which a main home screen is displayed on the touch screen

190. The main home screen is a first screen displayed on the touch screen 190 when the power of the mobile terminal 100 is turned on. Further, when the mobile terminal 100 has different home screens of several pages, the main home screen may be a first home screen of the home screens of several pages. Short-cut icons 191-1, 191-2, and 191-3 for executing frequently used applications, a main menu switching key 191-4, time, weather, and the like, are displayed on the home screen. The main menu switching key 191-4 displays a menu screen on the touch screen 190. Further, a status bar 192, which displays a battery charging status, an intensity of a received signal, and a current time, is disposed on an upper end of the touch screen 190.

A home button 161a, a menu button 161b, and a back button 161c are formed below the touch screen 190. The home button 161a displays the main home screen on the touch screen 190. For example, when the home button 161a is pressed in a state where a menu screen, or a home screen different from the main home screen, is displayed on the touch screen 190, the main home screen is displayed on the touch screen 190. Further, when the home button 161a is pressed while applications are executed on the touch screen 190, the main home screen illustrated in FIG. 2 may be displayed on the touch screen 190. In addition, the home button 161a may be used to display recently used applications or a task manager on the touch screen 190.

The menu button 161b provides a connection menu, which can be used on the touch screen 190. The connection menu includes a widget addition menu, a background-changing menu, a search menu, an editing menu, an environment setup menu and the like.

The back button 161c may be used for displaying the screen that was executed just before the currently executed screen, or for terminating the most recently used application.

The first camera 151, an illumination sensor 170a, and a proximity sensor 170b are disposed on edges of the front surface 100a of the mobile terminal 100. The second camera 152, a flash 153, and the speaker 163 are disposed on a rear surface 100c of the mobile terminal 100, as shown in FIG. 3.

A power/reset button 161d, a volume button 160b, a terrestrial DMB antenna 141a for broadcasting reception, and one or a plurality of the microphones 162 may be disposed on a side surface 100b of the mobile terminal 100. The DMB antenna 141a may be fixed to the mobile terminal 100 or may be formed to be detachable from the mobile terminal 100.

Further, the connector 165 is formed on a lower side surface of the mobile terminal 100. A plurality of electrodes is formed in the connector 165, and the connector 165 may be connected to the external device through a wire. The earphone-connecting jack 167 may be formed on a side surface of an upper end of the mobile terminal 100. Earphones may be inserted into the earphone-connecting jack 167.

Figure 4:
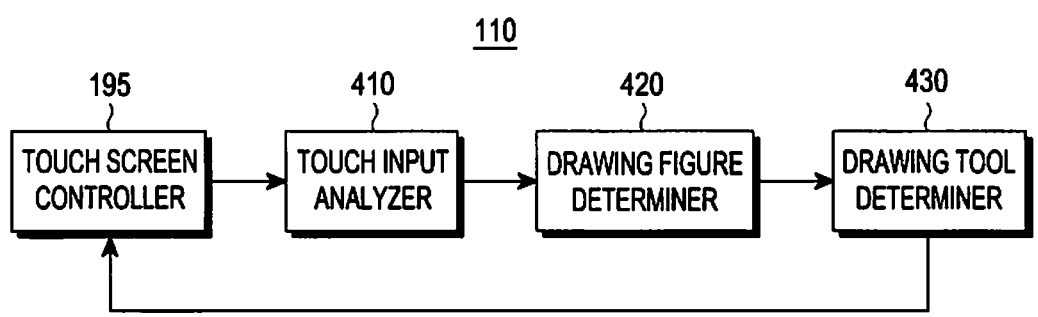
FIG. 4 is a block diagram illustrating a configuration of a controller illustrated in FIG. 1, according to an embodiment of the present invention.

FIG. 4 is a block diagram illustrating a configuration of the controller illustrated in FIG. 1, according to an embodiment of the present invention.

Referring to FIG. 4, the controller 110 includes a touch input analyzer 410, a drawing figure determiner 420, and a drawing tool determiner 430. Further, it is assumed that the touch screen controller 195 is implemented to be included in the controller 110, for convenience in describing this embodiment of the present invention.

When a touch input is input by the user through the touch screen 190, the touch screen controller 195 determines a coordinate of a point at which the touch input is input. According to an embodiment of the present invention, the touch screen 190 receives at least one touch input from the user. In an embodiment of the present invention, the touch screen controller 195 generates touch data, as data on the touch input, and stores the generated touch data in the storage unit 175, under a control of the controller 110. The touch data may include at least one of coordinates of a point where the touch input is detected, an input time when the touch input is input, and an input duration time indicating an amount of time that the touch input is maintained. The touch screen controller 195 generates touch data and transmits the generated touch data to the touch input analyzer 410.

For example, it is assumed that a first touch input having a coordinate of (x1, y1), a second touch input having a coordinate of (x2, y2), and a third touch input having a coordinate of (x3, y3) are input through the touch screen 190. The touch screen controller 195 determines the coordinates of the first touch input, the second touch input, and the third touch input, and records the determined coordinates in the storage unit 175. The touch screen controller 195 may record a time of 10:05:28.01 when the first touch input is input, a time of 10:05:28.01 when the second touch input is input, and a time of 10:05:28.03 when the third touch input is input in the storage unit 175, in accordance with each of the coordinates of the touch inputs. Further, when the first to third touch inputs are maintained for a duration time, for example, ten seconds, the touch screen controller 195 may record ten seconds in the storage unit 175 in accordance with each of the first to third touch inputs. In an embodiment of the present invention, the touch screen controller 195 may determine whether a touch input, of which a coordinate has been already determined, is continuously input at every time pre-stored in the storage unit 175.

The touch input analyzer 410 may consider a plurality of touch inputs performed within a reference time (for example, one second) pre-stored in the storage unit 175 as a plurality of simultaneously made touch inputs, or more specifically, as a multi-touch input. In embodiment of the present invention described above, the input times of the first and second touch inputs are 10:05:28.01, and the input time of the third touch input is 10:05:28.03. Since an interval between the first and second touch inputs and the third touch input is within one second, the touch input analyzer 410 may consider that the first to third touch inputs are simultaneously input. Accordingly, the touch input analyzer 410 may determine that the first to third touch inputs are a multi-touch input.

When the touch input detected through the touch screen 190 is the multi-touch input, a drawing figure determiner 420 determines a line or a figure corresponding to the multi touch input. Specifically, the drawing figure determiner 420 temporarily connects points at which the multi touch input is input to draw a figure, and determines whether a largest angle of the drawn figure is greater than or equal to a pre-stored reference angle (for example, 150 degrees). As described above, when the multi touch input includes three points, a triangle having the three points as its vertices is drawn by connecting the three points corresponding to the first to third touch inputs. The drawing figure determiner 420 determines whether a largest of the internal angles of the triangle is greater than or equal to a reference angle (for example, 150 degrees).

In an embodiment of the present invention, when the largest internal angle is greater than or equal to the reference angle, the drawing figure determiner 420 determines that a line or a figure drawn by the multi touch input, for example, the first to third touch inputs, is a straight line. In contrast, when the largest internal angle is less than the reference angle, the drawing figure determiner 420 determines that a line or a figure drawn by the multi touch input, for example, the first to third touch inputs, is a circle or an oval.

When the line or the figure drawn by the multi touch input is determined by the drawing figure determiner 420, the drawing tool determiner 430 determines a drawing tool to be executed. When the line or the figure determined by the drawing figure determiner 420 is a straight line, the drawing tool determiner 430 determines that a linear tool is to be executed. Further, when the line or the figure determined by the drawing figure determiner 420 is a circle, an oval, or a curved line such as an arc, the drawing tool determiner 430 determines that a circular tool is to be executed. The drawing tool determiner 430 then controls the touch screen 190 or the touch screen controller 195 to display the linear tool or the circular tool.

Figure 5:
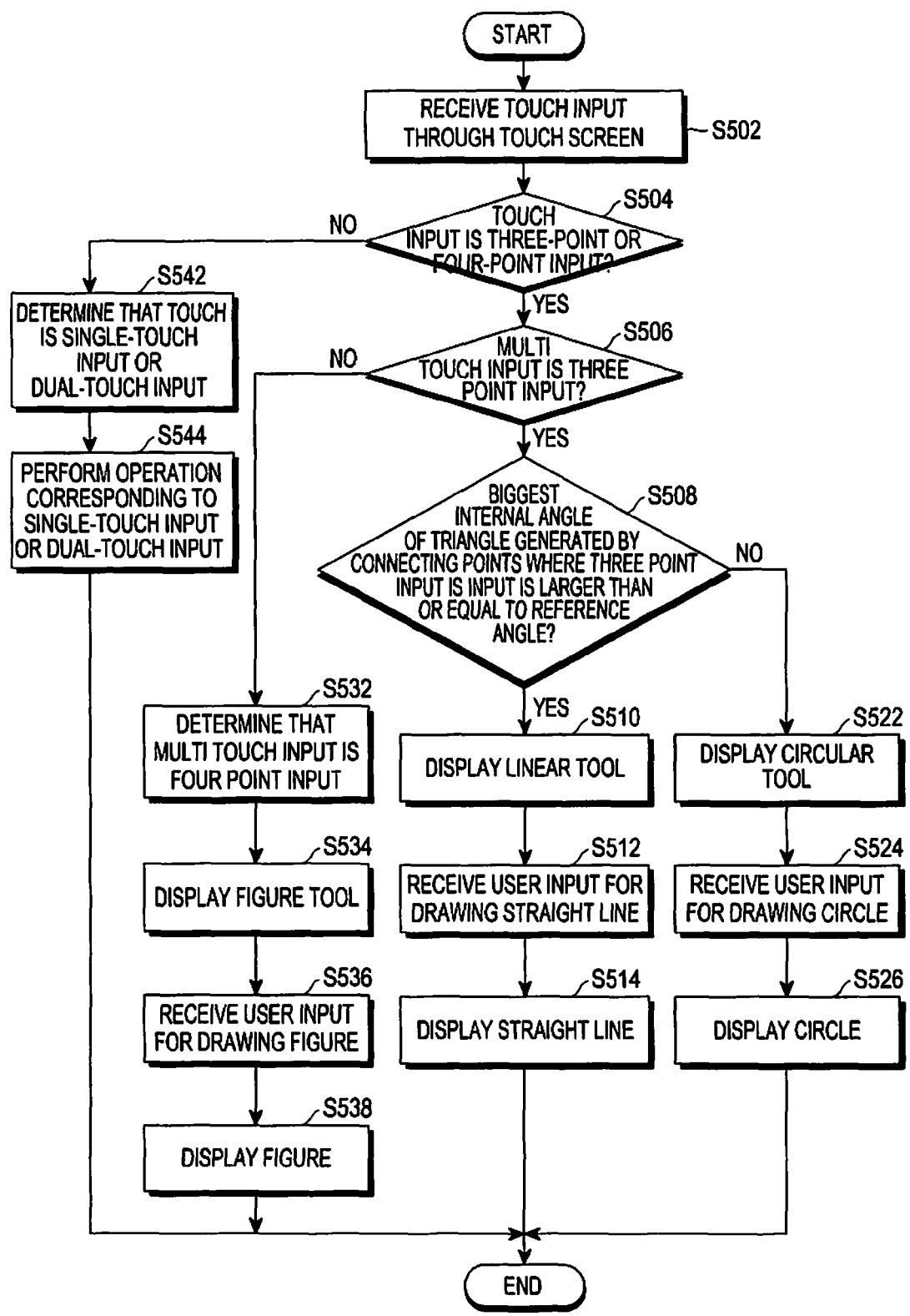
FIG. 5 is a flowchart illustrating a method of controlling the mobile terminal illustrated in FIG. 1, according to an embodiment of the present invention.

FIG. 5 is a flowchart illustrating a method of controlling the mobile terminal illustrated in FIG. 1, according to an embodiment of the present invention.

In FIG. 5, it is assumed that the mobile terminal 100 is executing a drawing mode. In FIG. 5, it is also assumed that a multi-touch input is performed through at least three points on the touch screen 190.

Referring to FIG. 5, the mobile terminal 100 receives a touch input through the touch screen 190, in step S502. When the mobile terminal 100 receives the touch input, the touch screen controller 195 converts a position of the touch input to a coordinate and transmits the coordinate to the controller 110, or more specifically, the touch input analyzer 410. The touch screen controller 195 generates touch data including at least one of the coordinates, an input time, and an input duration time of the touch input, and transmits the generated touch data to the touch input analyzer 410. In step 502, the controller 110 may count one or more points inputted the touch input on the touch screen. The controller 110 may determine classification of the touch input (e.g., a single touch input, a dual touch input, a three-point input, a four-point input, etc) according to a number of the one or more points.

The touch input analyzer 410 determines whether the touch input is a three-point or four-point input, in step S504. The touch input analyzer 410 determines whether the touch input is the three-point or four-point input based on the touch data generated by the touch screen controller 195. When the number of coordinates of points of the touch input is three or four, and an input interval between input times of the three or four touch inputs is within a reference time, the touch input analyzer 410 determines that the touch input is the three-point or four-point input. In contrast, when the number of coordinates of points of the touch input is one or two, the touch input analyzer 410 determines that the touch input is a single-touch or dual-touch input. Further, when the interval between the input times of the touch inputs is longer than or equal to the reference time, the touch input analyzer 410 determines that each of the touch inputs is a separate single-touch input.

When the touch input is not the three-point or four-point input in step S504, the touch input analyzer 410 determines that the touch input is the single or dual touch input, in step S542. As described above, when the touch input is the single or dual touch input, the controller 110 including the touch input analyzer 410 performs an operation corresponding to the single or dual touch input, in step S544.

According to an embodiment of the present invention, the touch screen 190 may receive a single touch input from the user. The single touch input may be made when the user desires to indicate a dot on the touch screen 190. In an embodiment of the present invention, the single-touch input may be made to change a color or thickness of a line, to change a font, size, or a color of a character, or to remove input data. The dual-touch input may be input when the user desires to indicate a dot or a line on the touch screen 190.

When the touch input is determined to be the multi-touch input in step S504, the touch input analyzer 410 determines whether the multi-touch input is a three-point input, in S506.

The three-point input simultaneously indicates touch inputs to three points of the touch screen 190. In an embodiment of the present invention, it is assumed that the multi touch input made through the touch screen 190 is the three-point input or a four-point input simultaneously made to four points of the touch screen 190. Further, in an embodiment of the present invention, it is assumed that the three-point input is for executing the linear tool or the circular tool, and the four-point input is for executing the figure tool.

When it is determined that the multi-touch input is not the three-point input in step S506, the touch input analyzer 410 determines that the multi-touch input is the four-point input, in step S532. When the four-point input is input through the touch screen 190, the drawing figure determiner 420 controls the touch screen 190 or the touch screen controller 195 to display the figure tool on the touch screen 190. The touch screen 190 displays the figure tool, in step S534. The touch screen 190 receives a user input for selecting a figure, in step S536. When receiving the user input for selecting the figure, the touch screen 190 displays the corresponding figure, in step S538.

In the embodiment of the present invention represented in FIG. 5, the figure tool is a tool for drawing at least one figure, and may include a plurality of figures (for example, a triangle, a quadrangle, a parallelogram, a rhombus, a pentagon, and a hexagon). The touch screen 190 displays the figure tool including the plurality of figures under a control of the controller 110, which includes the drawing tool determiner 430. In an embodiment of the present invention, the figure tool may be displayed on the touch screen 190 only while the three-point input is input. Further, the touch screen 190 may receive the single touch input or the multi-touch input in addition to the three-point input as the user input for selecting one of the plurality of figures while the figure tool is displayed.

When it is determined that the multi touch input is the three-point input in step S506, the drawing figure determiner 420 determines whether a largest internal angle of a triangle, which is generated by connecting the input points (hereinafter, referred to as the three points) where the three-point input is input, is greater than or equal to a reference angle in, step S508. According to an embodiment of the present invention, the drawing figure determiner 420 draws the triangle by temporarily connecting the three points. Further, the drawing figure determiner 420 calculates each of the internal angles of the triangle made by the three points and determines whether the largest internal angle of the triangle is greater than or equal to the reference angle. The triangle made by temporarily connecting the three points may not be displayed on the touch screen 190. When the largest internal angle of the triangle is greater than or equal to the reference angle, the drawing figure determiner 420 determines that the three-point input is a multi-touch input for drawing a line. In contrast, when the largest internal angel of the triangle is smaller than the reference angle, the drawing figure determiner 420 determines that the three-point input is a multi touch input for drawing a circle.

When it is determined the largest internal angel of the triangle generated by connecting the three points is smaller than the reference angle in step S508, the drawing tool determiner 430 determines to display the circular tool on the touch screen 190. The drawing tool determiner 430 controls the touch screen 190 or the touch screen controller 195 to display the circular tool based on coordinates of the three-point input.

The circular tool is implemented such that points, or coordinates, of the three-point input are included in an arc or close to the arc, and displayed on the touch screen 190. For example, the circular tool may be displayed in a range where each of the input points of the three-point input is within 1 cm of a radius of the arc. Specifically, the user may input a touch input for drawing an arc in a range within 1 cm from the points into which the three-point input is input.

As described above, the touch screen 190 displays the circular tool based on the coordinates of the three-point input, in step S522. The touch screen 190 receives a user input for drawing a circle, in S524. The touch screen 190 displays the corresponding circle, in step S526.

In an embodiment of the present invention, the circular tool may be displayed on the touch screen 190 only while the three-point input is input. Further, the touch screen 190 may receive the single touch input or the multi-touch input in addition to the three-point input as the user input for drawing the circle while the circular tool is displayed.

When it is determined that the largest internal angle of the triangle generated by connecting the three points is larger than or equal to the reference angle in step S508, the drawing tool determiner 430 determines to display the linear tool on the touch screen 190. The drawing tool determiner 430 controls the touch screen 190 or the touch screen controller 195 to display the linear tool based on the coordinates of the three-point input. The linear tool may be implemented in a form where the points, or the coordinates, of the three-point input are included in a straight line or close to the straight line, and displayed on the touch screen 190. For example, the linear tool may be displayed in a range where each of the input points of the three-point input is within 1 cm of a top and a bottom of the straight line. Specifically, the user may input a touch input for drawing the straight line in a range within 1 cm of the top and the bottom from the points into which the three-point input is input.

As described above, the touch screen 190 displays the linear tool based on the coordinates of the three points, in step S510. The touch screen 190 receives the user input for drawing the straight line, in step S512. When receiving the user input for drawing the straight line, the touch screen 190 displays the corresponding straight line, in step S514.

In an embodiment of the present invention, the linear tool may be displayed on the touch screen 190 only while the three-point input is input. Further, the touch screen 190 may receive the single touch input or the multi-touch input other than the three-point input as the user input for drawing the straight line while the linear tool is displayed.

In an embodiment of the present invention, the controller 110 may determine whether the multi touch input is a five-point touch input. Specifically, between S504 and S542, a step of determining whether the touch input is the five-point touch input may be added. When the multi-touch input is the five-point touch input, the controller 110 may control the mobile terminal 100 to perform an operation corresponding to the five-point touch input. When the multi-touch input is not the five-point touch input, the controller 110 may perform step S542.

In an embodiment of the present invention, when the multi-touch input is the five-point touch input, the controller 110 may control the mobile terminal 100 to display the drawing tool (for example, the linear tool, the circular tool, or the figure tool) on the touch screen 190.

Figure 6B:
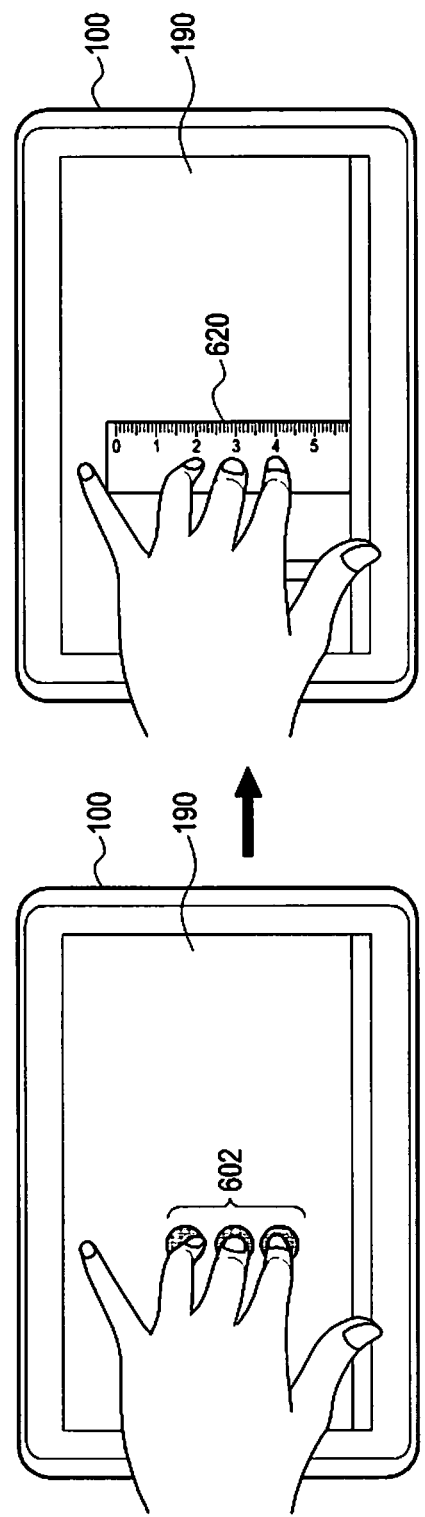

FIGS. 6A and 6B are diagrams illustrating execution of the linear tool in the mobile terminal illustrated in FIG. 1, according to an embodiment of the present invention. In this embodiment, it is assumed that the three-point input is detected as the multi-touch input through the touch screen 190.

Referring to FIGS. 6A and 6B, the touch screen 190 of the mobile terminal 100 receives three-point inputs 601 and 602 from the user. When the three-point inputs 601 and 602 are input, the touch screen 190 displays linear tools 610 and 620.

Referring to FIG. 6A, the user horizontally inputs the three-point input 601 into the touch screen 190 by using three fingers. The touch screen 190 displays the linear tool 610 according to the three-point input. The drawing tool determiner 430 may determine a direction or a position of the linear tool 610 displayed on the touch screen 190. In an embodiment of the present invention, the drawing tool determiner 430 controls the touch screen 190 or the touch screen controller 195 to display the drawing tool in the same direction as the direction in which the three-point input is input. In FIG. 6A, the three-point input is made in a horizontal direction. The drawing tool determiner 430 controls the touch screen 190 or the touch screen controller 195 to display the linear tool corresponding to the three-point input also in the horizontal direction.

Referring to FIG. 6B, the user vertically inputs the three-point input into the touch screen 190 by using three fingers. The touch screen 190 displays the linear tool 620 according to the three-point input. Similar to FIG. 6A, the drawing tool determiner 430 controls the touch screen 190 or the touch screen controller 195 to display the drawing tool in the same direction as the direction in which the three-point input is input. In FIG. 6B, since the three-point input is horizontally made, the drawing tool determiner 430 controls the touch screen 190 or the touch screen controller 195 to display the linear tool 620 in a vertical direction.

FIGS. 7A to 7I are diagrams illustrating execution of the linear tool in the mobile terminal illustrated in FIG. 1, according to another embodiment of the present invention. In this embodiment, operations of the mobile terminal 100 may be sequentially performed in an order from FIG. 7A to FIG. 7I. Also, in this embodiment, it is assumed that three point-inputs 701 and 702 are inputs for executing linear tools 710 and 720.

FIG. 7A illustrates the mobile terminal 100 in a state in which a drawing mode is executed. The mobile terminal 100 of FIG. 7A is in a state in which a user input for executing the drawing tool, that is, the multi touch input is not yet received from the user.

FIG. 7B illustrates the mobile terminal 100 into which the multi-touch input is input. As illustrated in FIG. 7B, the touch screen 190 receives the three-point input 701 as the multi touch input.

FIG. 7C illustrates the mobile terminal 100 displaying the linear tool 710 according to the three-point input 701. The linear tool 710 is displayed at a position close to the three-point input 701. Accordingly, in FIG. 7C, the linear tool 710 is displayed under three fingers of the user inputting the three-point input 701.

FIG. 7D illustrates the mobile terminal 100 receiving a user input for drawing a line in a state where the linear tool 710 is displayed. In FIG. 7D, the user input is a touch input made through a stylus pen 731. As illustrated in FIG. 7D, the user may draw the line in the position close to the linear tool 710 by using the stylus pen 731. The user draws the line having a desired length on the touch screen 190 with reference to a scale included in the linear tool 710. In FIG. 7D, the user draws the line from one point (first point) to the other point (second point) at an upper side of the scale included in the linear tool 710 in a direction from left to right.

FIG. 7E illustrates the mobile terminal 100 displaying a straight line according to the user input. As illustrated in FIG. 7D, when the user input for connecting the first point and the second point is input, the touch screen 190 may display the straight line connecting the first point and the second point under a control of the controller 110. As described above, the straight line connecting the first point and the second point is referred to as a first line 741. Specifically, the touch screen 190 of FIG. 7E displays the first line 741.

FIG. 7F illustrates the mobile terminal 100 receiving another three point input 702 in a state in which the first line 741 is displayed on the touch screen 190. As illustrated in FIG. 7F, the mobile terminal 100 may display the drawing tool on the touch screen 190 by executing the drawing tool corresponding to the multi-touch input whenever the multi-touch input is received from the user.

FIG. 7G illustrates the mobile terminal 100 displaying the linear tool 720 according to the three-point input 702. The linear tool 720 is displayed on a position close to the three-point input 702. Similar to FIG. 7C, the linear tool 720 may be displayed under three fingers of the user inputting the three-point input 702 in FIG. 7G.

FIG. 7H illustrates the mobile terminal 100 receiving a user input for drawing the line from the user in a state where the linear tool 720 is displayed. Similar to FIG. 7D, the user input in FIG. 7H is a touch input made through the stylus pen 731. As illustrated in FIG. 7H, the user draws the line in a position close to the linear tool 720 by using the stylus pen 731. The user draws the line having a desired length on the touch screen 190 with reference to the scale included in the linear tool 720. In FIG. 7H, the user draws the line from one point (third point) on a right side of the scale included in the linear tool 720 to the other point (fourth point) in a direction from top to bottom.

FIG. 7I illustrates the mobile terminal 100 displaying a straight line according to a user input. As illustrated in FIG. 7I, when the user input for connecting the third point and the fourth point is input, the touch screen 190 may display the straight line connecting the third point and the fourth point under a control of the controller 110. The straight line connecting the third point and the fourth point, as described above, is referred to as a second line 742. In FIG. 7I, the first line 741 and the second line 742 form a right angle and meet at one point. Specifically, the touch screen 190 of FIG. 7I displays the first line 741 and the second line 742.

FIGS. 8A to 8E are diagrams illustrating execution of the circular tool in the mobile terminal illustrated in FIG. 1, according to an embodiment of the present invention.

FIG. 8A illustrates the mobile terminal 100 in a state in which a drawing mode is executed. The mobile terminal 100 of FIG. 8A is in a state in which a user input for executing the drawing tool, that is, the multi-touch input, is not yet received from the user.

FIG. 8B illustrates the mobile terminal 100 into which the multi-touch input is input. Referring to 8B, the touch screen 190 receives a three-point input 801 as the multi touch input.

FIG. 8C illustrates the mobile terminal 100 displaying a circular tool 810 according to the three-point input 801. The circular tool 810 is displayed at a position close to the three-point input 801 and may display a scale showing angles. Further, in FIG. 8C, the circular tool 810 may be displayed on the touch screen 190 such that three points, which correspond to the three fingers of the user inputting the three point input 801, are all included in the circle. In addition, the circular tool 810 may be displayed on the touch screen 190 such that a longest line of the lines generated by connecting the three points becomes a diameter of the circle.

In an embodiment of the present invention, the user may control a size of the circle that the user desires to draw by moving at least one of the three points of the three-point input 801. For example, the user may change at least one coordinate of the three points by folding or opening at least one of the fingers pressing the three points of the touch screen 190. When the coordinates of the three points are changed as described above, lengths of lines generated by connecting the three points are also changed. The controller 110 may control a size of the circular tool 810 displayed on the touch screen 190 such that a longest line of the lines generated by connecting the three points becomes, or corresponds to, a diameter of the circle or a width of the circular tool. For example, when the user draws in one of the three fingers, the controller 110 controls the touch screen 190 to reduce the size of the circular tool 810. In contrast, when the user spreads one of the three fingers, the controller 110 controls the touch screen 190 to enlarge the size of the circular tool 810.

FIG. 8D illustrates the mobile terminal 100 receiving a user input for drawing a circle or an arc from the user in a state where the circular tool 810 is displayed. In FIG. 8D, the user input is a touch input made through a stylus pen 831. As illustrated in FIG. 8D, the user may draw a line in a position close to the circular tool 810 by using the style pen 831. The user draws the line having a desired angle on the touch screen 190 with reference to a scale included in the circular tool 810. In FIG. 8D, the user draws the line from one point (first point) to the other point (second point) in an upper side of the scale included in the circular tool 810 in a form of the arc. With respect to the arc, the controller 110 may determine whether the arc is an arc having a pre-stored angle (an included angle between two straight lines generated by connecting a center of the circle and two ends of the arc) or an arc having a pre-stored length or longer. As a result of the determination, when the arc is not the arc having the pre-stored angle or the pre-stored length or longer, the controller 110 determines that the input is not an effective user input and controls the mobile terminal 100 not to display the arc. Similarly, in the example of the straight line, the controller 110 may determine whether the straight line is a straight line having a pre-stored length or longer.

FIG. 8E illustrates the mobile terminal 100 displaying an arc 821 according to the user input. As illustrated in FIG. 8D, when the user input for connecting the first point and the second point is input, the touch screen 190 may display a circle or a part of the circle generated by connecting the first point and the second point, that is, the arc 821, under a control of the controller 110.

Figure 9:
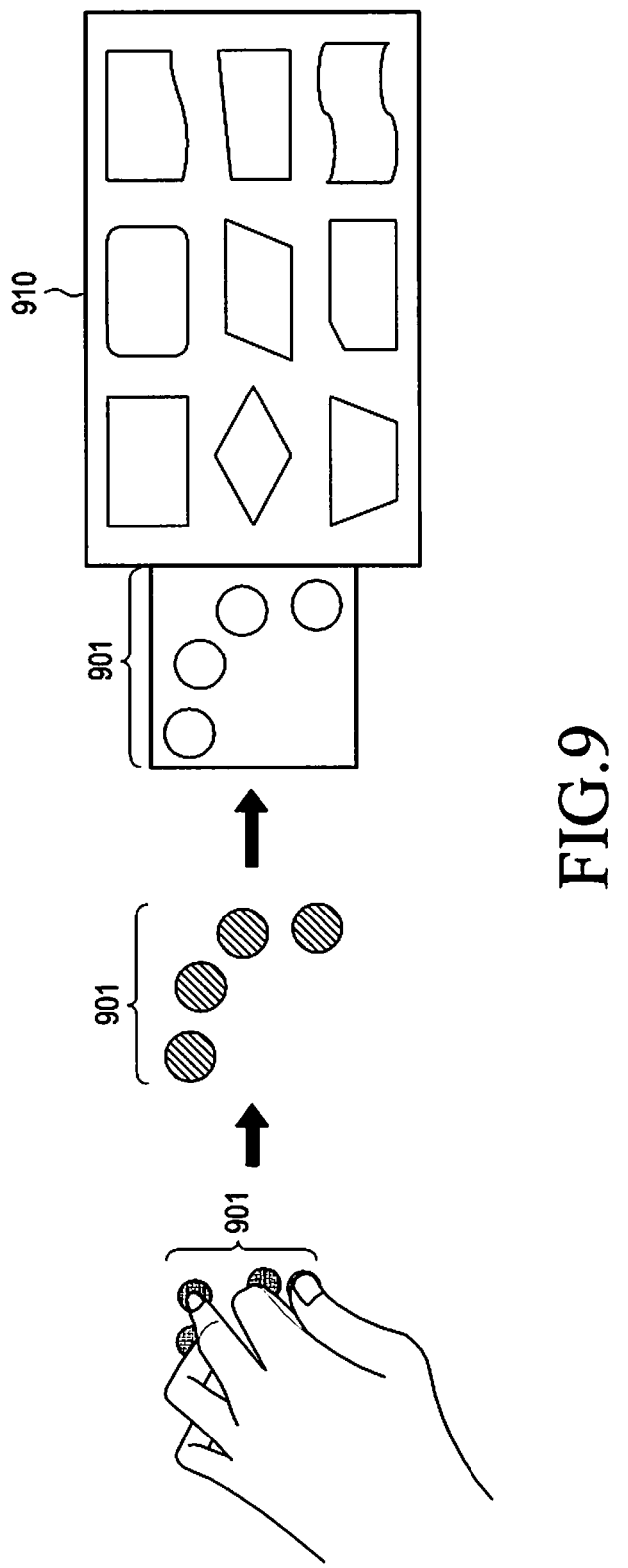
FIG. 9 is a diagram illustrating execution of a figure tool in the mobile terminal illustrated in FIG. 1, according to an embodiment of the present invention.

FIG. 9 is a diagram illustrating execution of the figure tool in the mobile terminal illustrated in FIG. 1, according to an embodiment of the present invention.

Referring to FIG. 9, the user inputs a multi-touch input by touching four points on the touch screen 190, that is, a four-point input 901 into the touch screen 190. When the touch screen 190 detects the four-point input 901, the controller 110 controls the touch screen 190 to display a figure tool 910 corresponding to the four-point input. In FIG. 9, the figure tool 910 is displayed on a right side of the four points where the four-point input 901 is detected. In an embodiment of the present invention, the figure tool 910 may be displayed on a left side, an upper side, or a lower side of the four-point input 901 as well as the right side, and a position of the figure tool 910 may vary depending on the user input FIGS. 10A to 10H are diagrams illustrating execution of a figure tool in the mobile terminal illustrated in FIG. 1, according to an embodiment of the present invention. In this embodiment, operations of the mobile terminal 100 may be sequentially performed in an order from FIG. 10A to FIG. 10H. Further, in this embodiment, it is assumed that a four-point input 1001 is an input for executing a figure tool 1010.

FIG. 10A illustrates the mobile terminal 100 in a state in which a drawing mode is executed. The mobile terminal 100 of FIG. 10A is in a state in which a user input for executing the drawing tool, that is, the multi-touch input, is not yet received from the user.

FIG. 10B illustrates the mobile terminal 100 into which the multi-touch input is input. Referring to 10B, the touch screen 190 receives the four-point input 1001 as the multi-touch input.

FIG. 10C illustrates the mobile terminal 100 displaying the figure tool 1010 according to the four-point input 1001. The figure tool 1010 is displayed at a position close to the four-point input 1001. Accordingly, in FIG. 10C, the figure tool 1010 is displayed adjacent to three fingers of the user inputting the four-point input 1001. According to an embodiment of the present invention, the mobile terminal 100 may control the touch screen 190 to continuously display the figure tool 1010 even though the four-point input 1001 is changed to a three-point input 1002 after the figure tool 1010 is displayed. Specifically, when the figure tool 1010 is displayed on the touch screen 190, even though one of the four fingers inputting the four-point input 1001 is removed from the touch screen 190, the figure tool 1010 may be continuously displayed on the touch screen 190.

FIG. 10D illustrates the mobile terminal 100 receiving a user input for selecting one of the figures included in the figure tool 1010, that is, a first input from the user in a state in which the figure tool 1010 is displayed.

Referring to FIG. 10D, the four-point input 1001 of FIG. 10B is changed to the three-point input 1002. The first input may be made as a touch input by one of the remaining fingers, aside from the three fingers inputting the three-point input 1002. In an embodiment of the present invention, the touch screen 190 may receive the first input from the finger that does not touch the touch screen 190 during a process of changing the four-point input 1001 to the three-point input 1002. Further, in an embodiment of the present invention, the touch screen 190 receives the first input from a finger, aside from the three fingers inputting the three-point input 1002, or a stylus pen 1020.

In FIG. 10D, it is assumed that the first input for selecting one of the figures included in the figure tool 1010 is made through a finger aside from the three fingers inputting the three-point input 1002. Further, the figures included in the figure tool 1010 illustrated in FIGS. 10C to 10G are limited to nine figures, such as first to ninth figures 1011, 1012, 1013, 1014, 1015, 1016, 1017, 1018, and 1019 for the convenience of description. Referring to FIG. 10D, the figure selected by the first input is the fourth figure 1014.

FIG. 10E illustrates the mobile terminal 100 receiving a user input for selecting the figure, that is, a second input 1003. In FIG. 10E, the touch screen 190 receives the second input by one finger, aside from the three fingers inputting the three-point input 1002. The user who uses the mobile terminal 100 may input the second input by flicking a surface of the touch screen 190 with one finger, aside from the three fingers inputting the three-point input 1002, or a stylus pen 1020.

FIG. 10F illustrates the mobile terminal 100 displaying the figure tool 1010 of which an arrangement of the figures 1011, 1012, 1013, 1014, 1015, 1016, 1017, 1018, and 1019 is changed. As illustrated in FIG. 10E, when the second input 1003 is input, the controller 110 controls the touch screen 190 to display the changed arrangement of the figures 1011, 1012, 1013, 1014, 1015, 1016, 1017, 1018, and 1019 included in the figure tool 1010. In an embodiment of the present invention, by changing the arrangement of the figures 1011, 1012, 1013, 1014, 1015, 1016, 1017, 1018, and 1019, a figure that the user desires to finally select may be displayed close to the three-point input 1002.

In FIG. 10F, the touch screen 190 receives a user input for reselecting the figure, that is, a third input from the user. Referring to FIG. 10F, the figure selected by the third input is the fifth figure 1015. Specifically, the user desires to finally select the fifth figure 1015.

FIG. 10G illustrates the mobile terminal 100 receiving a user input for drawing the fifth figure 1015 finally selected by the user, that is, a fourth input. Referring to FIG. 10G, the touch screen 190 receives a touch input of drawing the fifth figure 1015 through a stylus pen 1020.

FIG. 10H illustrates the mobile terminal 100 displaying the fifth figure 1015 drawn according to the fourth input made through the touch screen 190. The touch screen 190 displays the fifth figure 1015 on the touch screen 190 by displaying a line according to the fourth input under a control of the controller 110.

In this embodiment of the present invention, it has been described that the fourth input is received as the user input for drawing the finally selected fifth figure 1015. However, the fifth figure 1015 illustrated in FIG. 10H may be displayed using only the third input.

Embodiments of the present invention described above provide a mobile terminal that can draw a line or a figure by using a drawing tool, and a method of controlling the mobile terminal.

It may be appreciated that the method of controlling the mobile terminal according to the embodiments of the present invention can be implemented in software, hardware, or a combination thereof. Any such software may be stored, for example, in a volatile or non-volatile storage device such as a ROM, a memory such as a RAM, a memory chip, a memory device, or a memory Integrated Circuit (IC), or a recordable optical or magnetic medium such as a Compact Disc (CD), a Digital Versatile Disc (DVD), a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Accordingly, the present invention includes a program for a code implementing the apparatus and method described and a machine (a computer or the like)-readable storage medium for storing the program.

Moreover, such a program as described above can be electronically transferred through an arbitrary medium such as a communication signal transferred through cable or wireless connection, and embodiments of the present invention properly include equivalent mediums. In addition, the above-described electronic apparatus may receive and store the program from a program supply apparatus wiredly or wirelessly connected thereto. The program providing apparatus may include a memory for storing a program containing instructions for allowing the mobile terminal to perform a preset content protecting method and information required for the content protecting method, a communication unit for performing wired or wireless communication with the mobile terminal, and a controller for transmitting the corresponding program to the mobile terminal according to a request of the mobile terminal or automatically.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of controlling a mobile terminal including a touch screen supporting a multi-touch input, the method comprising:
   determining a number of one or more points inputted as a first touch input on the touch screen;
   when the number is 3, determining the first touch input as a three-point input;
   determining a size of a largest internal angle of a triangle generated by connecting points of the three-point input on the touch screen;
   displaying one of a linear tool and a circular tool based on a size of the largest internal angle of the triangle;
   receiving a second touch input;
   generating a line corresponding to the second touch input by interworking with one of the linear tool and the circular tool; and
   displaying the generated line on the touch screen.

2. The method of claim 1, wherein displaying one of the linear tool and the circular tool comprises:
   determining whether the largest internal angle of the triangle is greater than or equal to a pre-stored reference angle;
   displaying the linear tool based on coordinates of the points when the largest internal angle of the triangle is greater than or equal to the pre-stored reference angle; and
   displaying the circular tool based on coordinates of the points when the largest internal angle of the triangle is less than the pre-stored reference angle.

3. The method of claim 2, wherein, when the linear tool is displayed, receiving the second touch input comprises receiving a user input of drawing a line in a position close to the linear tool.

4. The method of claim 3, wherein, when the linear tool is displayed, generating the line comprises:
   determining whether the line has a length that is greater than or equal to a pre-stored length, and
   generating the line when the length is greater than or equal to the pre-stored length.

5. The method of claim 2, wherein, when the circular tool is displayed, receiving the second touch input comprises receiving a user input of drawing an arc in a position close to the circular tool.

6. The method of claim 5, wherein, when the circular tool is displayed, generating the line comprises:
   determining whether the arc has an angle that is greater than or equal to a pre-stored angle; and
   generating the arc when the angle is greater than or equal to the pre-stored angle.

7. The method of claim 1, wherein displaying the generated line comprises removing the one of the linear tool and the circular tool from the touch screen.

8. The method of claim 1, further comprising:
   when the number is 4, determine the first touch input as a four-point input;
   displaying a figure tool corresponding to the four-point input;
   receiving a third touch input selecting one of a plurality of figures included in the figure tool; and
   displaying the selected one of the plurality of figures on the touch screen.

9. The method of claim 8, further comprising:
   receiving a fourth touch input; and
   rearranging the plurality of figures in the figure tool in response to the fourth touch input.

10. The method of claim 8, further comprising receiving a fourth touch input tracing the selected one of the plurality of figures included in the figure tool, wherein the selected on of the plurality of figures is displayed based on the fourth touch input.

11. A mobile terminal comprising:
    a touch screen configured to receive a first touch input, and a second touch input; and
    a controller configured to:
    determine a number of one or more points inputted as a first touch input on the touch screen;
    when the number is 3, determine the first touch input as a three-point input;
    determine a size of a largest internal angle of a triangle generated by connecting points of the three-point input on the touch screen,
    control the touch screen to display one of a linear tool and a circular tool based on a size of the largest internal angle of the triangle,
    generate a line corresponding to the second touch input by interworking with the one of the linear tool and the circular tool, and
    control the touch screen to display the generated line.

12. The mobile terminal of claim 11, wherein, in controlling the touch screen to display one of the linear tool and the circular tool, the controller determines whether the largest internal angle of the triangle is greater than or equal to a pre-stored reference angle, displays the linear tool based on coordinates of the points when the largest internal angle of the triangle is greater than or equal to the pre-stored reference angle, and displays the circular tool based on coordinates of the points when the largest internal angle of the triangle is less than the pre-stored reference angle.

13. The mobile terminal of claim 12, wherein, when the linear tool is displayed, the second touch input is a user input of drawing a line in a position close to the linear tool.

14. The mobile terminal of claim 13, wherein, when the linear tool is displayed, the controller generates the line by determining whether the line has a length that is greater than or equal to a pre-stored length, and generating the line when the length is greater than or equal to the pre-stored length.

15. The mobile terminal of claim 12, wherein, when the circular tool is displayed, the second touch input is a user input of drawing an arc having a pre-stored angle or larger in a position close to the circular tool.

16. The mobile terminal of claim 15, wherein, when the circular tool is displayed, the controller generates the line by determining whether the arc has an angle that is greater than or equal to a pre-stored angle, and generating the arc when the angle is greater than or equal to the pre-stored angle.

17. The mobile terminal of claim 11, wherein the controller removes the one of the linear tool and the circular tool from the touch screen when the controller displays the generated line on the touch screen.

18. The mobile terminal of claim 11, wherein
    when the number is 4, the controller determines the first touch input as a four-point input, and controls the touch screen to display a figure tool corresponding to the four-point input
    when a third touch input selecting one of a plurality of figures included in the figure tool is received, the controller controls the touch screen to display the one of the plurality of figures on the touch screen.

19. The mobile terminal of claim 18, wherein the touch screen receives a fourth touch input, and the controller rearranges the plurality of figures in the figure tool in response to the fourth touch input.

20. The mobile terminal of claim 18, wherein the touch screen receives a fourth touch input tracing the selected one of the plurality of figures included in the figure tool, and the controller displays the selected one of the plurality of figures based on the third touch input.

* * * * *